May 7, 1968 W. T. ILLINGWORTH 3,382,437
NETWORK TESTING APPARATUS INCLUDING MEANS FOR
AUTOMATICALLY MAKING TEST CONNECTIONS
Filed Nov. 30, 1964 4 Sheets-Sheet 1
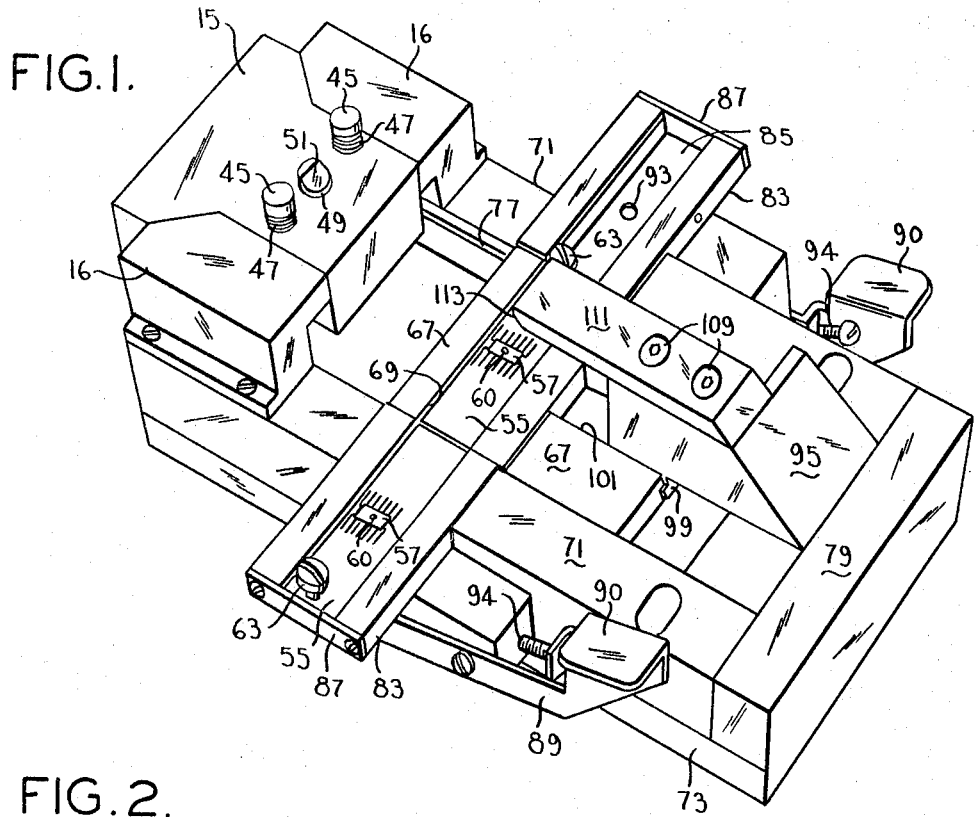
FIG.1.
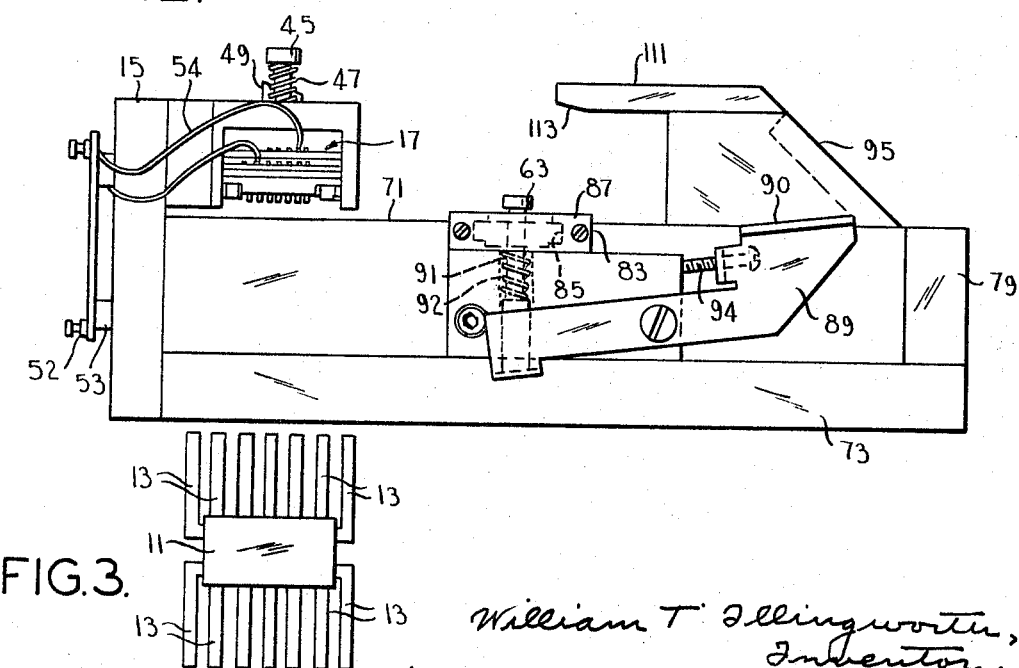
FIG.2.
FIG.3.
William T. Illingworth,
Inventor.
Koenig, Senniger, Powers and Leavitt,
Attorneys.

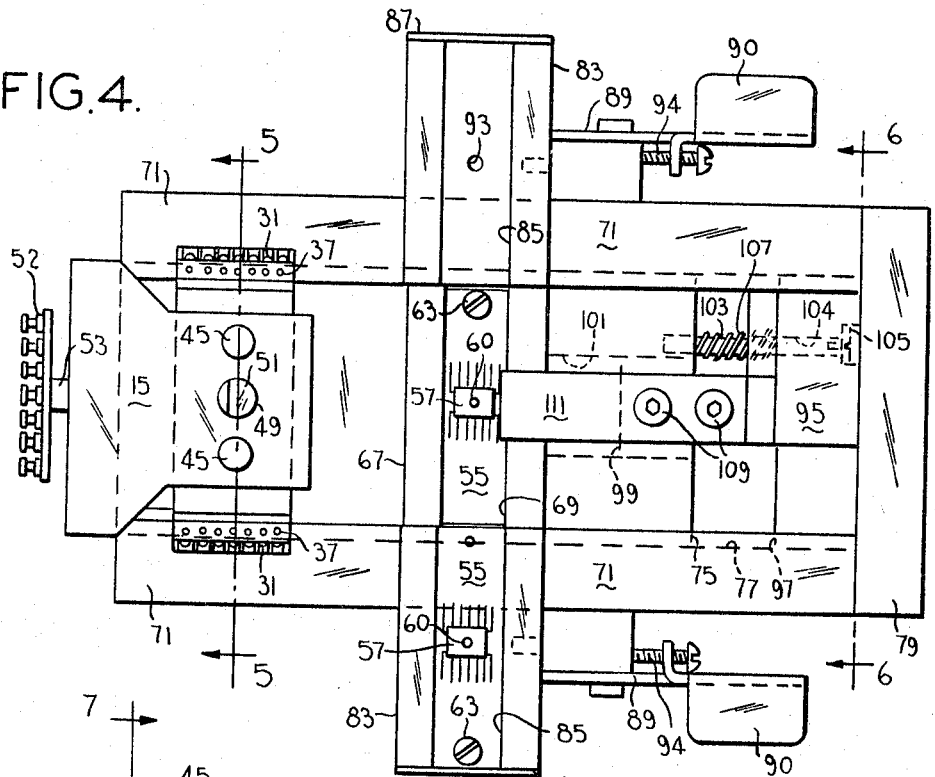
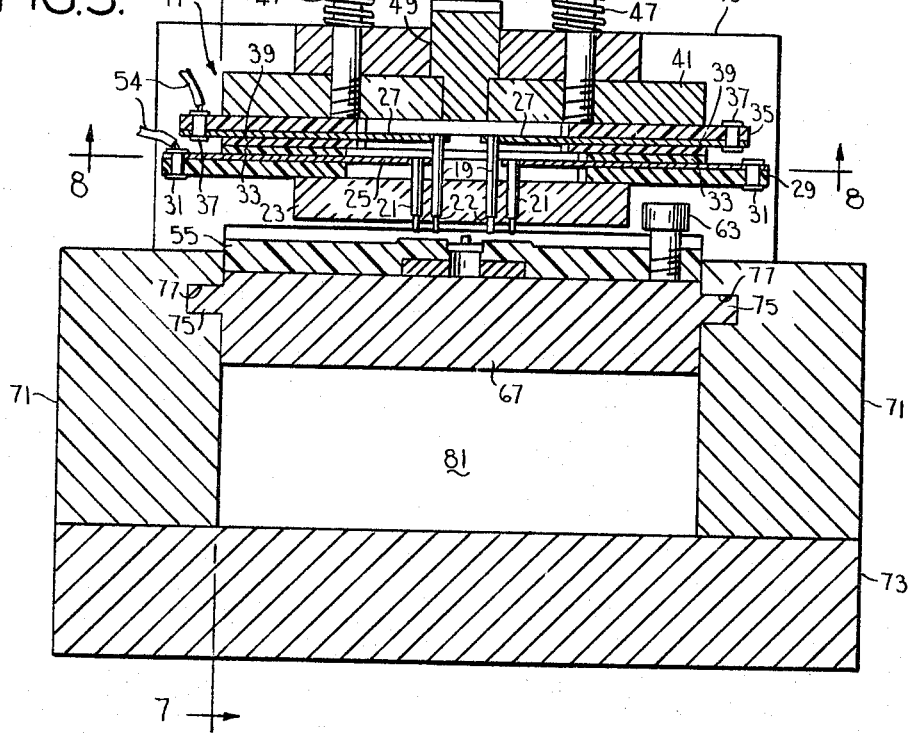

May 7, 1968  W. T. ILLINGWORTH  3,382,437
NETWORK TESTING APPARATUS INCLUDING MEANS FOR
AUTOMATICALLY MAKING TEST CONNECTIONS
Filed Nov. 30, 1964  4 Sheets-Sheet 4

# United States Patent Office 3,382,437
Patented May 7, 1968

3,382,437
NETWORK TESTING APPARATUS INCLUDING MEANS FOR AUTOMATICALLY MAKING TEST CONNECTIONS
William T. Illingworth, Houston, Tex., assignor to Texas Instruments Incorporated, Dallas, Tex., a corporation of Delaware
Filed Nov. 30, 1964, Ser. No. 414,694
12 Claims. (Cl. 324—158)

ABSTRACT OF THE DISCLOSURE

In the testing apparatus disclosed, an integrated circuit network retained in a carrier is moved into a testing station by a carriage which is reciprocable between the testing station and a second position in which the network is spaced apart from the testing station. The carriage is moved by an operating member which is connected to the carriage by a lost-motion connection. Contact means are moved into engagement with the network by movement of the operating member beyond that which brings the carriage to the testing station. The carriers are fed into the carriage on tracks which extend transversely to the sliding movement of the carriage.

This invention relates to apparatus for testing electronic networks and more particularly to apparatus for establishing electrical test connections to miniature networks having multiple terminals.

In the manufacture of integrated semiconductor networks, particularly those in which several active elements are formed in a single bar or slice of semiconductor material, it is necessary that many complex electrical tests be performed to insure that each element is performing properly. Typically, the networks are mounted in a standard package having a plurality of terminals arranged in a predetermined pattern. In making the necessary electrical tests, a large number of connections must be made to these terminals. If they were made individually, the testing procedure would be a very time consuming process and the risk of damage to the miniature network would be great due to the large amount of handling required. Further, for very accurate testing, it is highly desirable that two separate contacts be made to each terminal so that an error reducing "Kelvin" test connection can be established. In a Kelvin contact arrangement one of the pair of separate contact points is employed to subject the network to preselected test conditions while measurements are made through the other. For example, current may be applied through one of the contacts while voltage is measured at the other. In this way any voltage drop caused by the flow of test current through the contact resistance at the first contact will be excluded from the voltage measurement taken at the second contact.

Among the several objects of the present invention may be noted the provision of apparatus for establishing test connections to electronic network; the provision of such apparatus which will establish suitable test connections to miniature networks having multiple terminals; the provision of such apparatus which facilitates the handling and testing of networks without damage thereto; the provision of such apparatus which will permit networks to be tested quickly and easily; and the provision of such apparatus which will establish a Kelvin connection at each of the terminals of a network. Other objects and features will be in part apparent and in part pointed out hereinafter.

According to one aspect of the invention, the networks, which may for example be integrated semi-conductor networks, are held for handling through the testing procedure in carriers having a nest for holding a network. The carriers are transported on a carriage which slides or reciprocates between a first position in which a network held by a carrier in said carriage occupies said testing station and a second position in which such a network is spaced apart from said testing station. The carriers are delivered into the carriage on a track which extends from said second position transversely to the direction of sliding movement of the carriage. A reciprocable operating member is provided for moving the carriage between the first and second positions and the apparatus includes means for moving the contact head into engagement with a network carried by the carriage when said carriage is brought into the first position by said operating member.

The invention accordingly comprises the constructions and apparatus hereinafter described, the scope of the invention being indicated in the following claims.

In the accompanying drawings in which one of various possible embodiments of the invention is illustrated, FIGURE 1 is a perspective of apparatus for establishing test connections to miniature semi-conductor networks, the carriage thereof being shown in a retracted position;

FIGURE 2 is an elevation of the FIGURE 1 apparatus with parts broken away;

FIGURE 3 is a plan view of a flat package configuration for a miniature semiconductor network;

FIGURE 4 is a plan view of the apparatus of FIGURE 1;

FIGURE 5 is a section taken substantially on the line 5—5 of FIGURE 4, the carriage being shown in an advanced position;

Figure 6:
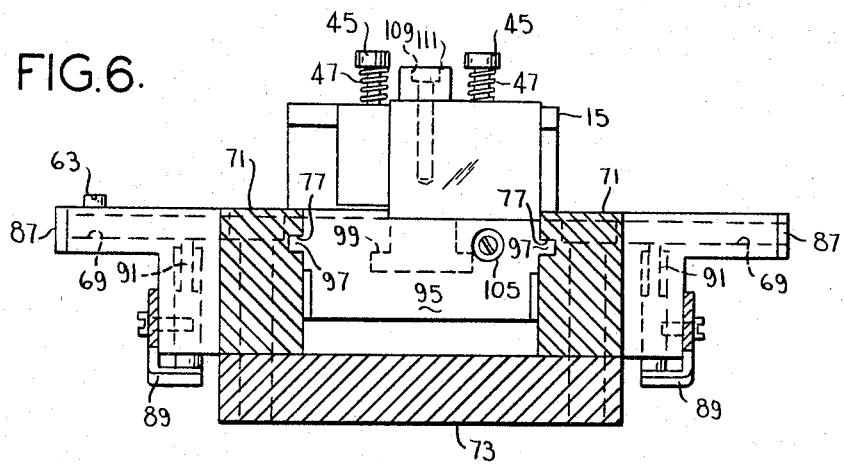
FIGURE 6 is a section taken substantially on the line 6—6 of FIGURE 4.

Referring now to the drawings, the apparatus illustrated is arranged for testing integrated semi-conductor networks packaged in the flat configuration shown on an enlarged scale in FIGURE 3. This package comprises a generally rectangular body 11, within which are contained the active semi-conductor elements, and a plurality of flat foil terminals 13 extending parallel to each other from the opposite longer sides of the body 11. To the rear of the testing apparatus, as illustrated in FIGURE 1, is a bracket 15. In FIGURE 1 the area around the bracket is shrouded by protective covers 16. For clarity, these covers are omitted in the other views. Bracket 15 carries a contact head 17 (FIGURE 2) which can be moved into engagement with an appropriately positioned network for establishing test connections thereto. The location of bracket 15 and contact head 17 thus defines a testing station for networks.

Figure 8:
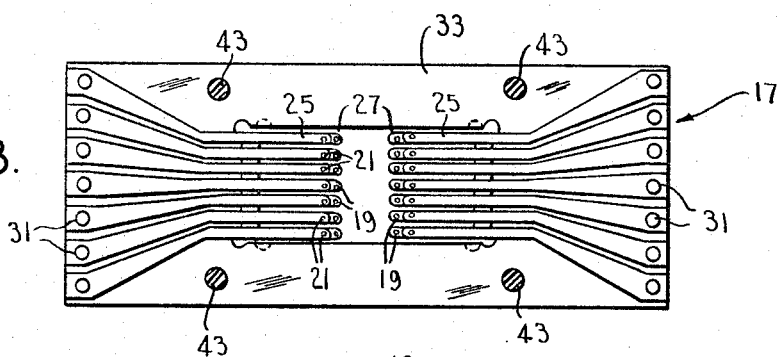
FIGURE 8 is a view of the contact head of the apparatus looking upward, the view being taken substantially on the line 8—8 of FIGURE 5.

The contact head 17, which may be seen in greater detail in FIGURES 5 and 8, includes a plurality of elongate cylindrical contact pins 19 and 21 which are of two different lengths. There are two contact pins for each of the terminals 13 of a network, one long pin 19 and one short pin 21. The long pins 19 for the terminals on each side of a network are arrayed in a column, as are the short pins. The lower ends of the pins are of reduced diameter and are pointed or chisel-shaped for establishing an intimate contact with a network terminal 13. Pins 19 and 21 are supported parallel to one another in a guide block 23 for limited longitudinal movement of the pins therein, there being internal shoulders 22 in block 23 which serve as stops for reduced-diameter portions of the pins.

Figure 7:
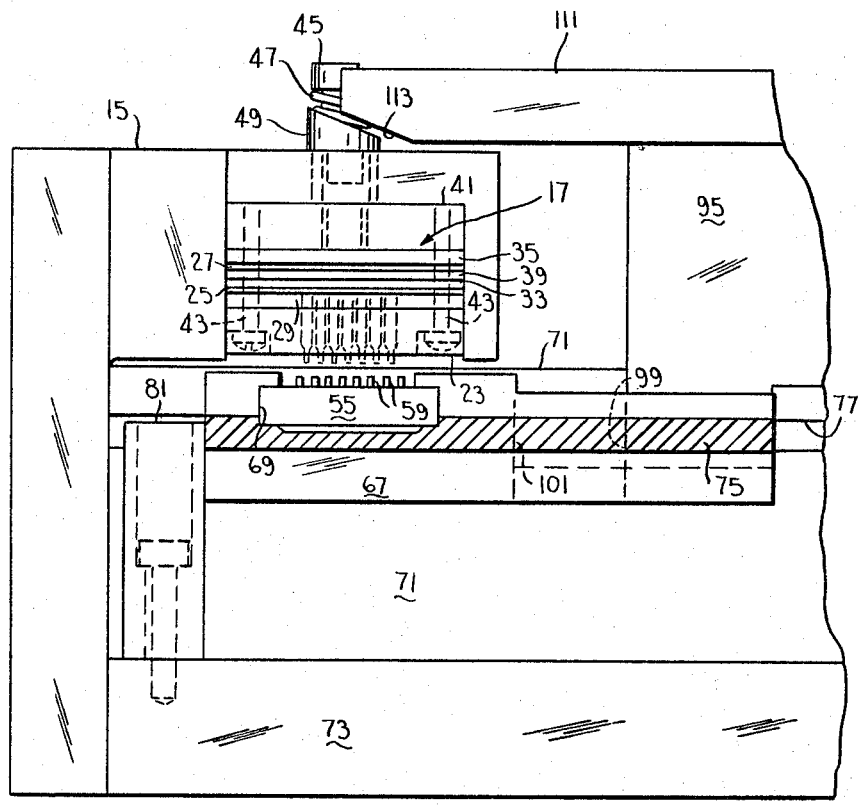
FIGURE 7 is a view substantially on the line 7—7 of FIGURE 5, the carriage again being in an advanced position.

Pins 21 and 19 are urged downwardly against the shoulders 22 by respective cantilevered metal leaf springs 25 and 27. When contact head 17 is moved toward a network so that pins 19 and 21 contact network terminals 13, the pins are thus deflected upwardly within block 23 against springs 25 and 27 to accommodate differences in height of terminals 13 and thereby provide a uniform contact pressure. The springs for each column of pins extend away from the pins generally parallel to one another and generally in the same plane. Further, the springs for the pin columns which operate on terminals on the same side of a network extend in generally the same direction, the springs for the pins of different lengths lying in spaced, generally parallel planes. The springs 25 for the shorter pins 21 are secured to an insulating terminal board 29 by hollow rivet-type terminals 31 and the base ends of the springs are backed and supported by a spacer 33. The springs 27 for the longer pins 19 are secured to a similar terminal board 35 by rivet terminals 37 and the base ends thereof are supported by a spacer 39. Guide 23, terminal board 29 and 35 with the attached springs, and spacers 37 and 39 are clamped to a support plate 41 by screws 43 (FIGURES 7 and 8).

A pair of cap screws 45 set into the plate 41 extend slidingly through the bracket 15. A pair of coil springs 47, held between bracket 15 and the heads of the screws, urge the contact head 17 upwardly into normal engagement with the bracket. A button 49 extends from the plate 41 through an aperture in bracket 15. The button includes an inclined cam following surface 51, the operation of which is described hereinafter. It will, however, be noted that, by depressing button 49, contact head 17 is lowered so that the contact pins 19 and 21 come into conductive engagement with the terminals 13 of a network occupying the testing station.

A terminal board 52 is attached to the back of the bracket 15 on spacers 53 (FIGURE 2). Rivet terminals 31 and 37, which are in contact with the springs 25 and 27, respectively, are connected to respective terminals on board 52 through flexible wiring 54. From board 52 suitable cabling can be conveniently arranged to connect the apparatus to electronic testing equipment.

Figure 9:
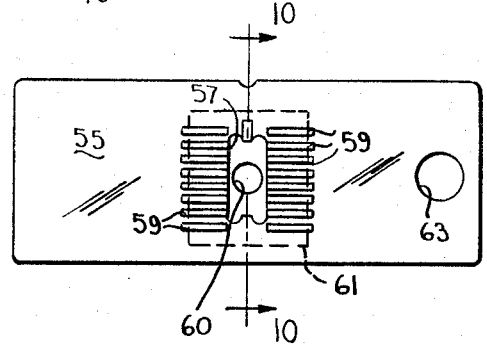
FIGURE 9 is a plan view of a network carrier used in the apparatus.
Figure 10:
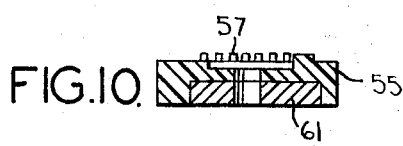
FIGURE 10 is a section on the line 10—10 of FIGURE 9.

For ease in handling the networks and for supporting and protecting the network terminals 13 during testing, the networks are held during the testing procedure in either of a pair of carriers 55. Each of the carriers includes a suitably shaped nest 57 for receiving and accurately positioning a network. A carrier 55 is shown in greater detail in FIGURES 9 and 10 and, as may be seen, nest 57 comprises two series of ribs 59 between which the terminals 13 of a network rest and are accurately positioned. Beneath its nest, each carrier includes a magnet 61 for holding a network securely in place in the nest. An aperture 60 is provided at the center of each nest and its respective magnet through which an ejector can operate for removing networks. Each carrier 55 is provided with a handle 63 for moving the carrier from side to side.

Carriers 55 are transported to and from the testing station in a carriage 67 having a transverse channel 69 for holding a carrier 55. The carriage is slidably reciprocable or movable toward and from the testing station on a slide which is constituted by a pair of side rails 71 mounted on a base plate 73, there being a projection 75 on each side of the carriage for sliding engagement with a mating slot 77 in the rails. The carriage is slidable between a first position in which a network, held in a carrier contained in channel 69, occupies said testing station and a second position in which such a network is spaced apart from and clear of the contact head 17. FIGURES 1, 2 and 4 show the carriage in the first position while FIGURES 5 and 7 illustrate the carriage as being in the second position. The slide defined by slotted side rails 71 is closed at the front by an end plate 79 (FIGURE 4), while at the rear the travel of the carriage 67 is limited by an adjustable stop 81 (FIGURE 7) so that the carriage will come to rest in a position such that the contact pins 19 and 21 are in registration with the network terminals 13.

On each side of the slide is mounted a track assembly 83 which is adapted to deliver a carrier 55 into carriage channel 69 at the second position. Each track assembly 83 includes a channel 85 which is in alignment with the carriage channel 69 when the carriage is in the second position. The channels 85 are closed at their outer extremities by end plates 87. Attached to each track assembly is a pivoted ejector lever 89. The end of each lever 89 nearest the front of the apparatus includes a handle 90 which is manually depressible to cause the other end of the lever to raise a pin 91. Each pin is slidingly supported in a vertical bore 93 extending through the respective track assembly. Each bore 93 is located so that it is in registration with the aperture 60 of a carrier 55 occupying the respective track assembly channel 85. Raising the pin 91 will thus lift and eject a network resting in the carrier nest. A coil spring 92 urges each spring downwardly and an adjustable stop screw 94 on each lever 89 limits the retraction of the respective pin.

Also mounted on rails 71 for reciprocable sliding movement toward and away from the testing station is an operating member 95. This member includes lateral projections 97 (FIGURE 6) for aligning engagement with the side rail slots 77 and also includes a foot portion 99 which slidingly interfits with a cutout portion 101 of carriage 67. Thus it can be seen that the operating member 95 and carriage 67 can not only slide along the side rails 71 but can also move with respect to each other.

As may be seen in FIGURE 4, the movement of the operating member with respect to the carriage 67 is limited by a stud 103 which is threaded into the carriage, passes slidingly through a bore 104 in the operating member 95 and is terminated by a cap 105 which is of larger diameter than the stud. The stud and cap thus constitute a lost-motion connection between carriage 67 and operating member 95. A coiled compression spring 107, wound around stud 103 between the carriage and the operating member, urges these members apart thereby biasing the lost-motion connection.

Attached to the top of the operating member 95 by screws 109 is a cam arm 111. This arm projects out over the carriage channel 69 and includes a ramp-like cam surface 113 which is adapted to engage the inclined surface 51 on button 49 for driving the contact head 17 downwardly.

Operation of this apparatus is as follows:

A semi-conductor network is placed on the nest of one of the carriers 55 when it is displaced to the side of the slide in one of the track assemblies 83. With the operating member 95 and the carriage 67 retracted to the front of the apparatus, the carrier 55 can then be moved into the carriage channel 69, using handle 63. By manually pushing the operating member 95 toward bracket 15, the carriage 67 will be transported to its first position in which the network to be tested occupies the testing station. After the carriage 67 has reached the end of its travel as determined by engagement with stop 81, the operating member 95 will continue to move toward the bracket 15 by taking up the lost motion permitted by the stud 103 and by compressing spring 107. This further movement of the operating member 95, beyond that necessary to bring carriage 67 into its first position, will cause the ramp surface 113 on cam arm 111 to engage and depress the button 49, thereby driving the contact head 17 into engagement with the then-stationary network. The pins 19 and 21 will conductively engage the terminals 13 of the network and thereby establish connections through which the electrical testing may be accomplished. It should be noted that, since two contacts are made to each terminal 13, one by a long pin 19 and the other by a short pin 21, a highly advantageous Kelvin test connection may be utilized in which connections for measurement may be made independently of connections used for subjecting the network to test conditions.

While one of the carriers is occupied in holding the network then being electrically tested, the other carrier will be in its respective track assembly. This other carrier can thus be unloaded using the ejector lever 89 and then be reloaded with a new network for testing while the testing of the network in the first carrier proceeds. Accordingly, it can be seen that the side-to-side shuttling of carriers through the track assemblies in combination with the carriage movement provides a greatly facilitated method of testing networks in which one network can be loaded into the apparatus while another is being simultaneously tested. It will also be noted that the number of movements which must be performed by the operator are held to a minimum, since a single movement of the operating member 95 both transports a network to the testing station and also brings the contacts into engagement with the stationary network.

In view of the above, it will be seen that the several objects of the invention are achieved and other advantageous results attained.

As various changes could be made in the above apparatus and constructions without departing from the scope of the invention, it is intended that all matter contained in the above description or shown in the accompanying drawings shall be interpreted as illustrative and not in a limiting sense.

What is claimed is:

1. Apparatus for establishing test connections to electronic networks, the networks each having a plurality of terminals, said apparatus comprising:
   means defining a testing station for a network, said means including a plurality of contacts adapted to be moved into engagement with the terminals of a network occupying said testing station;
   a carriage adapted to receive a network to be tested, said carriage being slidingly reciprocable between a first position in which a network carried thereby occupies said testing station and a second position in which such a network is spaced apart from said testing station;
   track means, extending from said second position transversely to the direction of sliding movement of said carriage at said second position, for delivering networks to be tested into said carriage;
   an operating member which is reciprocable in said direction of sliding for moving said carriage between said first and second positions, there being a lost-motion connection between said operating member and said carriage; and
   means, driven by movement of said operating member beyond that movement which brings said carriage to said first position, for moving said contacts into engagement with a network carried by said carriage whereby electrical testing of said networks can be accomplished through the connections established by said contacts.

2. Apparatus according to claim 1 in which said track means extends on opposite sides of said second position for a distance sufficient to accept at least one network on each side of said carriage.

3. Apparatus according to claim 1 including an ejector for removing networks from said track means.

4. Apparatus according to claim 1 in which there are two separate contacts for engagement with each of the terminals of a network whereby connections for measurement may be made independently of connections made for subjecting the network to test conditions.

5. Apparatus for establishing test connections to electronic networks, the networks each having a plurality of terminals, said apparatus comprising:
   means defining a testing station for a network, said means including a contact head adapted to be moved into engagement with a network occupying said test station, said contact head having a plurality of contacts for conductively engaging the network terminals;
   a pair of carriers, each of said carriers having a nest for holding a network;
   a carriage including means for receiving a carrier, said carriage being movable between a first position in which a network held by a carrier in said carriage occupies said testing station and a second position in which such a network is spaced apart from said testing station;
   track means for feeding said carriers into said carriage at said second position, said track means extending from said second position in opposite directions transverse to the direction of sliding movement of said carriage for a distance sufficient to accept one carrier on each side of said carriage;
   an operating number for moving said carriage between said first and second positions, there being a lost-motion connection between said member and said carriage; and means, responsive to a movement of said operating member beyond that which brings said carriage to said first position, for moving said contact head into engagement with a network carried by said carriage into said testing station whereby electrical testing of said networks can be accomplished through the connections established by said contacts.

6. Apparatus according to claim 5 in which said contact head includes a plurality of elongate contact pins for contacting the network terminals, a pin guide for maintaining said pins in a parallel configuration in alignment with a desired terminal pattern, said guide permitting limited longitudinal movement of said pins with respect thereto, and a respective cantilevered leaf spring for urging each pin toward the respective terminal whereby when said contact head is moved into engagement with a network, a substantially uniform contact pressure is provided on each terminal.

7. Apparatus according to claim 6 in which said contact head includes a pair of pins for each network terminal, said pins being arranged in a pattern of at least two parallel columns, the cantilevered springs for the two columns extending from said pins in generally the same direction, the springs for the pins in each column being generally coplanar, the springs for different columns being in spaced, substantially parallel planes.

8. Apparatus according to claim 5 further comprising an ejector on each side of said second position for removing networks from carriers in the track means.

9. Apparatus according to claim 5 in which each of said carriers includes magnet means for holding a network in its nest.

10. Apparatus according to claim 5 in which the means for moving said contacts includes a cam on said operating member and a cam follower on said contact head.

11. Apparatus for establishing test connections to electronic networks, the networks each having a plurality of terminals, said apparatus comprising:
   means defining a testing station for a network, said means including a contact head adapted to be moved into engagement with a network occupying said testing station, said contact head including a plurality of elongate metallic pins having pointed ends for contacting the network terminals, said pins being supported by a guide which permits limited longitudinal movement of said pins with respect thereto and being contacted and urged in the direction of said test station by respective cantilevered metal leaf springs, each of said springs including means for electrical connection to a testing circuit;

a pair of carriers, each of said carriers having a nest for accurately positioning a network;

a carriage including means for receiving a carrier;

a slide for said carriage, said slide defining a path for said carriage between a first position in which a network held by a carrier in said carriage occupies said testing station and a second position in which such a network is spaced apart from said testing station;

track means for feeding said carriers into said carriage at said second position, said track means extending on opposite sides of said slide transversely to the direction of sliding movement of said carriage for a distance sufficient to accept one carrier on each side of said carriage;

an operating member movable along said slide, there being a lost motion connection between said operating member and said carriage;

spring means for resiliently biasing said lost motion connection so that said operating member can be displaced along said slide beyond that position which places said carriage in said first position by overriding said spring means; and cam and cam follower means, coupling said operating member to said contact head, for moving said contact head into engagement with a network occupying said testing station when said operating member is driven beyond the position which places said carriage in said first position whereby said pins establish electrical connections to the network terminals.

12. Apparatus according to claim 11 in which said contact head includes two separate pins for engagement with each of the terminals of a network whereby connections for measurement may be made independently of connections made for subjecting the network to test conditions.

References Cited
UNITED STATES PATENTS 3,009,109   11/1961   Jankowski _____ 324—158
3,234,496   2/1966   Cedrone _____ 324—158 XR
3,239,059   3/1966   Cole _____ 209—73

OTHER REFERENCES

Electronics (Marrott et al.), Jan. 13, 1961, pp. 93–95.

RUDOLPH V. ROLINEC, *Primary Examiner.*

E. L. STOLARUN, *Assistant Examiner.*